Feb. 23, 1971  H. O. NELSON  3,564,820
GASEOUS FLOW SEPARATOR

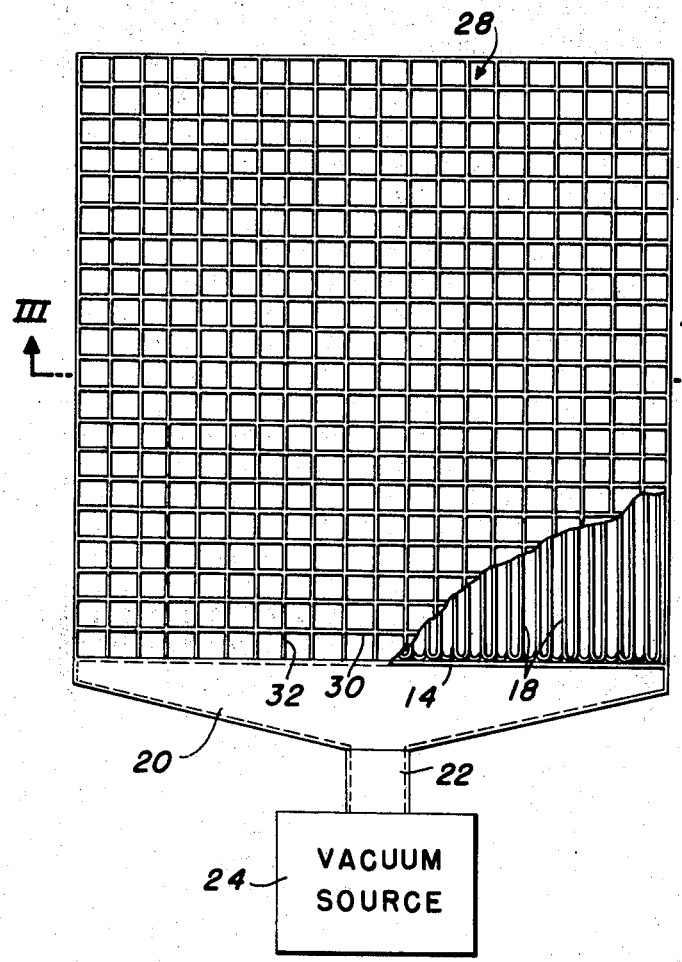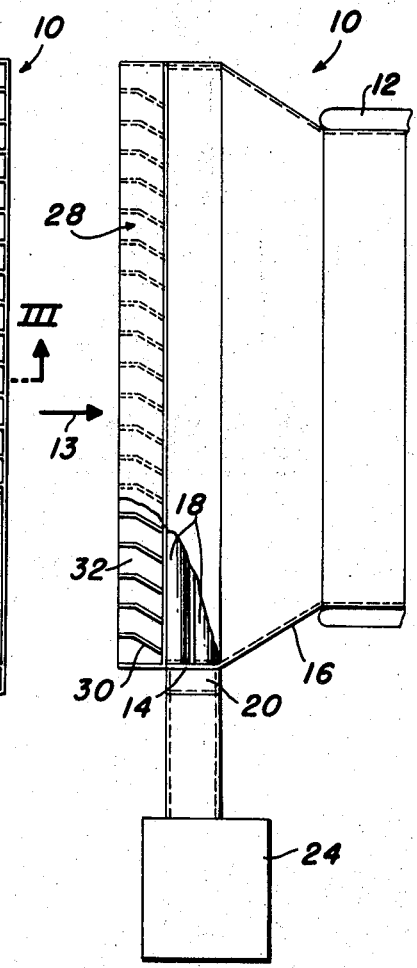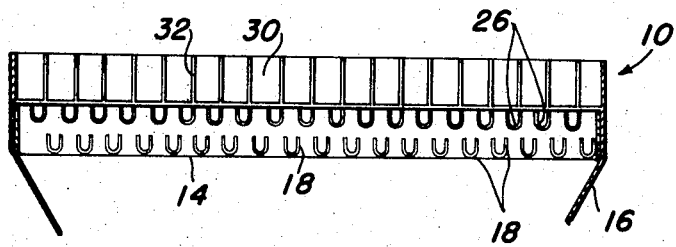

Filed April 2, 1969  2 Sheets-Sheet 2

INVENTOR.
HENRY O. NELSON
BY
George J. Rubens
ATTORNEYS

United States Patent Office 3,564,820
Patented Feb. 23, 1971

3,564,820
GASEOUS FLOW SEPARATOR
Henry O. Nelson, 5227 Castle Hills Drive,
San Diego, Calif. 92109
Filed Apr. 2, 1969, Ser. No. 812,731
Int. Cl. B01d 45/08
U.S. Cl. 55—278             1 Claim

ABSTRACT OF THE DISCLOSURE

A gaseous flow separator which has a plurality of vertical, spaced apart filter elements transversely extending across the flow in at least two rows, the filter elements in one row being staggered with respect to those in the other row to intercept substantially the entire flow, each filter element having means for entrapping the particulate matter in the flow and conducting the matter in a downward direction and out of the flow path.

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

This invention relates to separators for removing foreign particulate matter from gaseous flows, and more particularly to such separators having improved filter means for collecting and removing the particulate matter without materially affecting the pressure of the flow.

The problem of entrapping and removing particulate matter from gaseous flow is particularly acute in the air inlet of gas turbine aircraft engines where the introduction of foreign matter can cause a thrust reduction to the extent of creating a stall condition of the aircraft, as well as causing serious structural damage to the engine parts. The term foreign matter includes all particulate matter, both liquid or solid, such as rain, salt water spray, dust, stones and the like.

Several different approaches have been proposed to solve this problem. One method has been to circulate the inlet air through a centrifuge with the particulate matter removed by centrifugal force. This approach has been successful where the volume of air is relatively small. Another approach has been to provide a reverse flow of the inlet air which has limited results at low aircraft speeds. Still another common approach is to use an air maize consisting of fine screening, however, screens require frequent cleaning and replacement. Evaporation methods have been successful in removing rain particles, but are not satisfactory in handling salt spray because of the salt residue.

SUMMARY OF THE INVENTION

The flow separator of this invention provides a filtering means for removing particulate foreign matter, both liquid and solid, in a gaseous flow without materially decreasing the velocity of the flow and without necessitating frequent shutdown for servicing, replacement or cleaning. These results are achieved by providing a plurality of spaced filter elements that intercept substantially the entire cross-sectional area of the flow without restricting the flow. Each filter element is capable of entrapping the particulate matter and conducting it downwardly out of the path of the flow for disposal. In one embodiment the downward flow of the particulate matter is achieved by a series of horizontal baffles, and in another embodiment the downward flow is induced by inclining the filter elements with respect to the flow. In both embodiments the removal of the particulate matter can be enhanced by using a vacuum.

STATEMENT OF OBJECTS OF THE INVENTION

A principal purpose of this invention is to provide a gaseous flow separator that will efficiently remove foreign particulate matter, in either liquid or solid form, particularly salt water spray.

Another important object is to provide such a separator which will not materially reduce the velocity of the flow being filtered, and one that can be employed in a high mass flow, high velocity application.

Still other objects are to provide a separator that does not require frequent cleaning or replacement, and which is rugged in construction and light weight.

Other objects and many of the attendant advantages of this invention will be readily appreciated as the same becomes better understood by reference to the following detailed description when considered in connection with the accompanying drawings wherein:

FIG. 1 is a side elevation of one embodiment of the novel separator shown mounted in an air intake of gas turbine engine, a portion of the separator broken away to show the details of the filter elements and baffles;

FIG. 2 is a front elevation view of the separator of FIG. 1;

FIG. 3 is a cross-sectional view taken along line III—III of FIG. 2;

Figure 4:
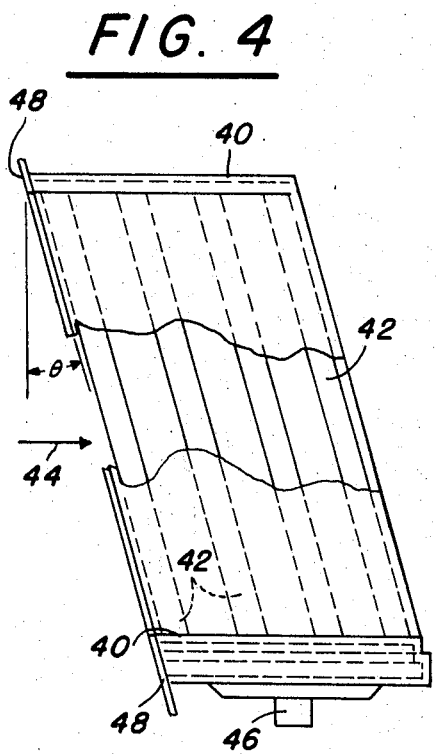
FIG. 4 is a side elevation view of another embodiment of the novel separator, a portion broken away to show the details.
Figure 5:
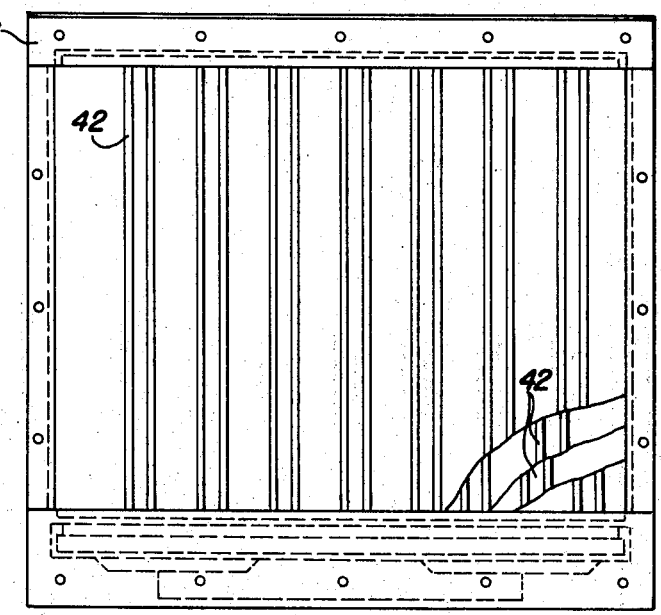
FIG. 5 is a front elevation view of the separator of FIG. 4.

Referring to the drawing where like reference numerals refer to similar parts throughout the figures, there is shown in FIG. 1 one embodiment of a novel gaseous flow separator 10 secured to the air intake 12 of a helicopter turbine engine, which use is intended to be representative of only one of the various uses to which the invention can be applied. The gaseous flow into the separator to be filtered is indicated by arrow 13. This installation has been found to be particularly suitable for removing salt water encountered in helicopter hovering over the ocean, as well as dust separation in operations in dusty areas like Viet Nam. Separator 10 is constructed of a frame 14, preferably of a size larger than the intake 12 and enclosed in a funnel-shaped transition duct 16 for mating with intake 12 and suitably secured therein.

A plurality of elongate filter elements 18 are secured vertically at their upper and lower ends within frame 14 by welding or the like. Each filter element contains means for entrapping the foreign matter flowing through the separator and for conducting the foreign matter downwardly by gravity to a drain manifold 20 formed in the lower portion of frame 14 and provided with a drain outlet 22. If desired the drain outlet 22 may be connected to a vacuum source diagrammatically illustrated at 24 to supplement the gravity flow.

The specific construction of filter elements 18 is not critical as they can be tubular, plates, rods, channels or the like as long as they provide a means for entrapping the foreign matter and conducting the matter out of the flow. In FIGS. 1–3 the specific filter element 18 illustrated is tubular with a portion of its forward wall facing the flow intermediate the ends cut away to form a U-shaped channel portion 26 to entrap the particulate flow. The bottom portion of each filter element is open to and communicates with manifold 20 to provide drainage for the captured foreign matter, and the application of a vacuum if such means is employed to enhance removal.

The specific arrangement and number of filter elements 18 to be positioned in the path of the flow is not critical and will depend to a great extent on the particular installation.

As shown in FIGS. 1-3, two rows of filter elements are provided, each row being staggered with respect to the other to intercept substantially all of the flow through the separator and yet not materially restrict the filtered flow through and around the filter elements on its way to air intake 12. As illustrated in FIGS. 4-7, additional rows of filter elements may be provided in the same separator stage, or separate stages may be provided in spaced relation.

As illustrated in the modification of FIGS. 1-3, a flow director 28 is attached to frame 14 just forward of and spaced from the filter elements. Flow director 28 is fabricated in the form of a crating with a plurality of horizontal and vertical baffles 30 and 32, respectively, which serves to distribute the flow uniformly over the entire cross-sectional area of the separator and against the filter elements positioned therein. To induce a downward driving force to the particulate matter in channel portions 26 of the filter elements, supplementing the suction created by the vacuum that may be utilized, horizontal baffles 30 may be inclined at a suitable angle downward as most clearly illustrated in FIG. 1. As will be presently described in the modification illustrated in FIGS. 3-7 a similar effect can be achieved by inclining the filter elements from the vertical.

A modified flow separator is shown in FIGS. 4-7 wherein a frame 40 has the side configuration of a parallelogram so as to support a plurality of elongate filter elements 42 in a canted position, the upper ends of filter elements being placed more forward with respect to the air flow, indicated at 44, than the lower end of the respective bottom ends. The degree $\theta$ of slant of the filter elements will vary depending on the airflow velocity and the particulate matter to be separated. For the removal of salt water, an angle of $\theta$ from 15° to 30° from the vertical has been found to remove effectively about 90% of the particulate matter in the airflow without appreciable reducing the velocity of the airflow.

Figure 7:
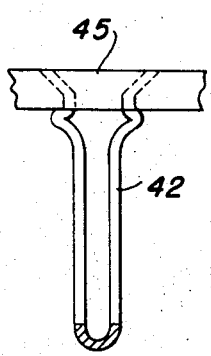
FIG. 7 is a sectional view of a portion of one of the filter members shown mounted to the frame.
Figure 6:
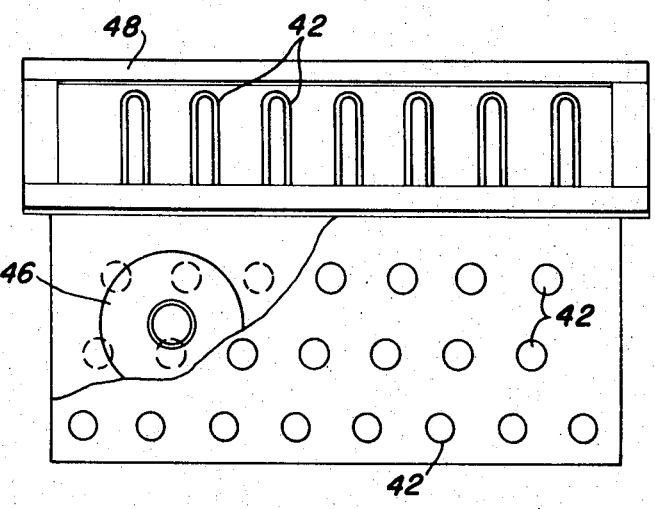
FIG. 6 is a bottom view of FIG. 5.

In this modification, four rows of filter elements have been employed, each row staggered with respect to the other to cover effectively the entire cross-sectional area of the flow. Each filter element 42 is of the type previously described, namely, being of a slotted tube type. As shown in FIG. 7 the unslotted ends of filter element tube are swaged into a corresponding opening in a header 45 of the frame. As in the previous modification a sump and drain 46 is provided on the bottom of the frame for disposing the particulate matter directly or through a suction pump. A flow director (not shown) similar to crating 28 as previously described with respect to the modification in FIGS. 1-3 may be employed on the modification of FIGS. 4-7. A mounting flange 48 may be secured to frame 40 for attaching the flow separator to a supporting structure.

The novel gaseous flow separator of this invention provides a simple and sturdy construction having no moving parts and suitable for a variety of uses requiring the removal of various types of foreign particulate matter in liquid or solid form. The disposition and number of filter elements can be tailored to the particular installation. There is no need for replacing or cleaning the filter elements, nor shutting down the installation to accomplish frequent repairs.

Obviously many modifications and variations of the prevent invention are possible in the light of the above teachings. It is therefore to be understood that within the scope of the appended claim, the invention may be practiced otherwise than as specifically described.

What is claimed is:
1. A gaseous flow separator comprising:
   an enclosure mounted across a duct;
   said enclosure having an air inlet substantially the same cross sectional area as said duct;
   a plurality of vertical spaced apart filter elements mounted in said enclosure and arranged transversely in at least two rows extending across the entire cross-section of said enclosure, one row of filter elements transversely staggered with respect to the other row to intercept substantially the entire cross-sectional area of said flow;
   said filter elements being elongate channel members having an open side facing the air inlet;
   means for deflecting said flow in a downward direction against the filter elements mounted in the inlet of the duct;
   said deflecting means being a grid or horizontal and vertical substantially planar vanes extending over the entire cross-sectional area of said inlet of the duct in front of said filter element;
   said horizontal and vertical vanes having the downstream portions canted downwardly;
   a drain manifold connected to the bottom of the duct and communicating with the filter elements at one of the ends thereof for removing particulate matter whereby particulate matter carried in the gaseous flow will be deflected downwardly by the horizontal vanes to be entrapped by the filter elements and conducted downwardly out of the flow while permitting substantially unrestricted filtered flow between said filter elements.

References Cited

UNITED STATES PATENTS

| | | | |
|---|---|---|---|
| 885,185 | 4/1908 | Serrell | 55—444 |
| 3,394,533 | 7/1968 | Sheng Li et al. | 55—438 |
| 362,191 | 5/1887 | Stuart | 55—444 |
| 514,439 | 2/1894 | Blessing | 55—342 |
| 1,400,860 | 12/1921 | Brown | 98—121 |
| 2,059,673 | 11/1936 | Watson | 55—415 |
| 2,178,240 | 10/1939 | Pascale | 55—464 |
| 2,940,376 | 6/1960 | Lambert | 98—121 |
| 3,241,312 | 3/1966 | Clark | 244—54 |
| 3,355,864 | 12/1967 | Sobeck | 55—443 |

FOREIGN PATENTS

| | | | |
|---|---|---|---|
| 216,879 | 1909 | Germany | 55—464 |

DENNIS E. TALBERT, JR., Primary Examiner

BERNARD NOZICK, Assistant Examiner

U.S. Cl. X.R.

55—306, 318, 418, 431, 436, 440, 444, 464, 482, 505; 60—39.09